(12) United States Patent
Sorensen

(10) Patent No.: US 10,824,757 B2
(45) Date of Patent: *Nov. 3, 2020

(54) SOCIAL MEDIA AND DATA SHARING CONTROLS

(71) Applicant: AirWatch LLC, Atlanta, GA (US)

(72) Inventor: Christian Blake Sorensen, Atlanta, GA (US)

(73) Assignee: AirWatch LLC, Atlanta, GA (US)

( * ) Notice: Subject to any disclaimer, the term of this patent is extended or adjusted under 35 U.S.C. 154(b) by 468 days.

This patent is subject to a terminal disclaimer.

(21) Appl. No.: 15/015,631

(22) Filed: Feb. 4, 2016

(65) Prior Publication Data

US 2016/0154975 A1 Jun. 2, 2016

Related U.S. Application Data

(63) Continuation of application No. 13/911,586, filed on Jun. 6, 2013, now Pat. No. 9,270,777.

(51) Int. Cl.
| | |
|---|---|
| *H04L 29/08* | (2006.01) |
| *G06F 21/62* | (2013.01) |
| *G06Q 50/00* | (2012.01) |
| *H04W 12/00* | (2009.01) |
| *H04L 12/58* | (2006.01) |

(52) U.S. Cl.
CPC ......... *G06F 21/6245* (2013.01); *G06Q 50/01* (2013.01); *H04L 51/10* (2013.01); *H04L 51/32* (2013.01); *H04L 67/306* (2013.01); *H04W 12/0027* (2019.01)

(58) Field of Classification Search
CPC ..... G06F 21/6245; G06Q 50/01; H04L 51/10; H04L 51/32; H04L 67/306
See application file for complete search history.

(56) References Cited

U.S. PATENT DOCUMENTS

| | | |
|---|---|---|
| 5,928,329 A | 7/1999 | Clark et al. |
| 5,961,590 A | 10/1999 | Mendez et al. |
| 5,974,238 A | 10/1999 | Chase, Jr. |
| 6,023,708 A | 2/2000 | Mendez et al. |
| 6,085,192 A | 7/2000 | Mendez et al. |
| 6,131,096 A | 10/2000 | Ng et al. |
| 6,131,116 A | 10/2000 | Riggins et al. |
| 6,151,606 A | 11/2000 | Mendez |
| 6,233,341 B1 | 5/2001 | Riggins |
| 6,269,369 B1 | 7/2001 | Robertson |
| 6,463,470 B1 | 10/2002 | Mohaban et al. |
| 6,560,772 B1 | 5/2003 | Slinger |
| 6,606,662 B2 | 8/2003 | Nagasaki |
| 6,708,221 B1 | 3/2004 | Mendez et al. |
| 6,714,859 B2 | 3/2004 | Jones |
| 6,726,106 B1 | 4/2004 | Han et al. |

(Continued)

*Primary Examiner* — Viet D Vu
(74) *Attorney, Agent, or Firm* — Thomas Horstemeyer, LLP

(57) ABSTRACT

Social media and data sharing controls may be provided. Upon receiving a request to transmit an element of data to a recipient, a determination may be made as to whether the recipient is appropriate to receive the element of data. In response to determining that the recipient is appropriate to receive the element of data, the element of data may be transmitted. In response to determining that the recipient is not appropriate to receive the element of data, at least one remedial action may be performed.

20 Claims, 3 Drawing Sheets

(56) References Cited

U.S. PATENT DOCUMENTS

| | | |
|---|---|---|
| 6,727,856 B1 | 4/2004 | Hill |
| 6,741,232 B1 | 5/2004 | Siedlikowski et al. |
| 6,741,927 B2 | 5/2004 | Jones |
| 6,766,454 B1 | 7/2004 | Riggins |
| 6,779,118 B1 | 8/2004 | Ikudome et al. |
| 6,904,359 B2 | 6/2005 | Jones |
| 6,965,876 B2 | 11/2005 | Dabbiere |
| 6,995,749 B2 | 2/2006 | Friend |
| 7,032,181 B1 | 4/2006 | Farcasiu |
| 7,039,394 B2 | 5/2006 | Bhaskaran |
| 7,039,679 B2 | 5/2006 | Mendez et al. |
| 7,064,688 B2 | 6/2006 | Collins et al. |
| 7,092,943 B2 | 8/2006 | Roese et al. |
| 7,184,801 B2 | 2/2007 | Farcasiu |
| 7,191,058 B2 | 3/2007 | Laird et al. |
| 7,203,959 B2 | 4/2007 | Nachenberg et al. |
| 7,225,231 B2 | 5/2007 | Mendez et al. |
| 7,228,383 B2 | 6/2007 | Friedman et al. |
| 7,275,073 B2 | 9/2007 | Ganji et al. |
| 7,284,045 B1 | 10/2007 | Marl et al. |
| 7,287,271 B1 | 10/2007 | Riggins |
| 7,308,703 B2 | 12/2007 | Wright et al. |
| 7,310,535 B1 | 12/2007 | MacKenzie et al. |
| 7,353,533 B2 | 4/2008 | Wright et al. |
| 7,363,349 B2 | 4/2008 | Friedman et al. |
| 7,363,361 B2 | 4/2008 | Tewari et al. |
| 7,373,517 B1 | 5/2008 | Riggins |
| 7,437,752 B2 | 10/2008 | Heard et al. |
| 7,444,375 B2 | 10/2008 | McConnell et al. |
| 7,447,506 B1 | 11/2008 | MacKenzie et al. |
| 7,447,799 B2 | 11/2008 | Kushner |
| 7,475,152 B2 | 1/2009 | Chan et al. |
| 7,539,665 B2 | 5/2009 | Mendez |
| 7,565,314 B2 | 7/2009 | Borgeson et al. |
| 7,590,403 B1 | 9/2009 | House et al. |
| 7,594,224 B2 | 9/2009 | Patrick et al. |
| 7,603,547 B2 | 10/2009 | Patrick et al. |
| 7,603,548 B2 | 10/2009 | Patrick et al. |
| 7,603,703 B2 | 10/2009 | Craft et al. |
| 7,617,222 B2 | 11/2009 | Coulthard et al. |
| 7,620,001 B2 | 11/2009 | Ganji |
| 7,620,392 B1 | 11/2009 | Maurya et al. |
| 7,650,491 B2 | 1/2010 | Craft et al. |
| 7,660,902 B2 | 2/2010 | Graham et al. |
| 7,665,118 B2 | 2/2010 | Mann et al. |
| 7,665,125 B2 | 2/2010 | Heard et al. |
| 7,685,645 B2 | 3/2010 | Doyle et al. |
| 7,702,322 B1 | 4/2010 | Maurya et al. |
| 7,702,785 B2 | 4/2010 | Bruton, III et al. |
| 7,735,112 B2 | 6/2010 | Kim et al. |
| 7,735,122 B1 | 6/2010 | Johnson et al. |
| 7,739,334 B1 | 6/2010 | Ng et al. |
| 7,752,166 B2 | 7/2010 | Quinlan et al. |
| 7,788,382 B1 | 8/2010 | Jones et al. |
| 7,792,297 B1 | 9/2010 | Piccionelli et al. |
| 7,840,631 B2 | 11/2010 | Farcasiu |
| 7,890,091 B2 | 2/2011 | Puskoor et al. |
| 7,912,896 B2 | 3/2011 | Wolovitz et al. |
| 7,917,641 B2 | 3/2011 | Crampton |
| 7,970,386 B2 | 6/2011 | Bhat et al. |
| 8,001,082 B1 | 8/2011 | Muratov |
| 8,012,219 B2 | 9/2011 | Mendez et al. |
| 8,041,776 B2 | 10/2011 | Friedman et al. |
| 8,046,823 B1 | 10/2011 | Begen et al. |
| 8,060,074 B2 | 11/2011 | Danford et al. |
| 8,069,144 B2 | 11/2011 | Quinlan et al. |
| 8,078,157 B2 | 12/2011 | Maurya et al. |
| 8,094,591 B1 | 1/2012 | Hunter et al. |
| 8,117,344 B2 | 2/2012 | Mendez et al. |
| 8,150,431 B2 | 4/2012 | Wolovitz et al. |
| 8,166,106 B2 | 4/2012 | Biggs et al. |
| 8,266,323 B2* | 9/2012 | Cisler ................ H04L 63/0272 709/245 |
| 8,694,577 B2 | 4/2014 | D'Angelo et al. |
| 9,300,620 B2* | 3/2016 | Bradley ................ H04L 51/32 |
| 9,712,340 B2* | 7/2017 | Surtani ............... H04L 12/6418 |
| 2002/0013721 A1 | 1/2002 | Dabbiere et al. |
| 2002/0055967 A1 | 5/2002 | Coussement |
| 2003/0110084 A1 | 6/2003 | Eberhard et al. |
| 2003/0172166 A1 | 9/2003 | Judge et al. |
| 2003/0204716 A1 | 10/2003 | Rockwood et al. |
| 2004/0123153 A1 | 6/2004 | Wright et al. |
| 2004/0181687 A1 | 9/2004 | Nachenberg et al. |
| 2004/0224703 A1 | 11/2004 | Takaki et al. |
| 2005/0246192 A1 | 11/2005 | Jauffred et al. |
| 2006/0190984 A1 | 8/2006 | Heard et al. |
| 2007/0033397 A1 | 2/2007 | Phillips, II et al. |
| 2007/0136492 A1 | 6/2007 | Blum et al. |
| 2007/0156897 A1 | 7/2007 | Lim |
| 2007/0174433 A1 | 7/2007 | Mendez et al. |
| 2007/0288637 A1 | 12/2007 | Layton et al. |
| 2008/0133712 A1 | 6/2008 | Friedman et al. |
| 2008/0134305 A1 | 6/2008 | Hinton et al. |
| 2008/0201453 A1 | 8/2008 | Assenmacher |
| 2009/0036111 A1 | 2/2009 | Danford et al. |
| 2009/0144632 A1 | 6/2009 | Mendez |
| 2009/0198997 A1 | 8/2009 | Yeap et al. |
| 2009/0260064 A1 | 10/2009 | McDowell et al. |
| 2009/0300739 A1 | 12/2009 | Nice et al. |
| 2009/0307362 A1 | 12/2009 | Mendez et al. |
| 2010/0005125 A1 | 1/2010 | Mendez et al. |
| 2010/0005157 A1 | 1/2010 | Mendez et al. |
| 2010/0005159 A1 | 1/2010 | Ishiguro |
| 2010/0005195 A1 | 1/2010 | Mendez et al. |
| 2010/0023630 A1 | 1/2010 | Mendez et al. |
| 2010/0100641 A1 | 4/2010 | Quinlan et al. |
| 2010/0120450 A1 | 5/2010 | Herz |
| 2010/0144323 A1 | 6/2010 | Collins et al. |
| 2010/0146269 A1 | 6/2010 | Baskaran |
| 2010/0186065 A1* | 7/2010 | Chung ................ H04H 60/14 726/1 |
| 2010/0254410 A1 | 10/2010 | Collins |
| 2010/0268844 A1 | 10/2010 | Quinlan et al. |
| 2010/0273456 A1 | 10/2010 | Wolovitz et al. |
| 2010/0299152 A1 | 11/2010 | Batchu et al. |
| 2010/0299376 A1 | 11/2010 | Batchu et al. |
| 2010/0299719 A1 | 11/2010 | Burks et al. |
| 2011/0004941 A1 | 1/2011 | Mendez et al. |
| 2011/0040875 A1* | 2/2011 | Scholz ................ G06Q 10/10 709/225 |
| 2011/0082900 A1 | 4/2011 | Nagpal et al. |
| 2011/0113062 A1 | 5/2011 | Quinlan et al. |
| 2011/0145932 A1 | 6/2011 | Nerger et al. |
| 2011/0153779 A1 | 6/2011 | Mendez et al. |
| 2011/0153783 A1 | 6/2011 | Ito |
| 2011/0167474 A1 | 7/2011 | Sinha et al. |
| 2011/0202589 A1 | 8/2011 | Piernot et al. |
| 2011/0225252 A1 | 9/2011 | Bhat et al. |
| 2011/0270799 A1 | 11/2011 | Muratov |
| 2011/0276805 A1 | 11/2011 | Nagpal et al. |
| 2011/0296186 A1 | 12/2011 | Wong et al. |
| 2011/0320552 A1 | 12/2011 | Friedman et al. |
| 2012/0005578 A1 | 1/2012 | Hawkins |
| 2012/0015644 A1 | 1/2012 | Danford et al. |
| 2012/0101392 A1 | 4/2012 | Bhunia et al. |
| 2012/0136941 A1* | 5/2012 | Howes ................ H04L 51/14 709/206 |
| 2012/0197980 A1* | 8/2012 | Terleski ................ G06Q 50/01 709/203 |
| 2012/0198547 A1 | 8/2012 | Fredette et al. |
| 2012/0331090 A1* | 12/2012 | Kimchi ............... H04L 67/1046 709/217 |
| 2013/0006879 A1* | 1/2013 | Ramanathan .......... G06Q 50/01 705/319 |
| 2013/0152169 A1 | 6/2013 | Stuntebeck |
| 2014/0337317 A1 | 11/2014 | Woss et al. |

* cited by examiner

SOCIAL MEDIA AND DATA SHARING CONTROLS

BACKGROUND

Social media and data sharing controls provide enhanced security and privacy during user interactions. In some situations, users may wish to share personal data with friends and enterprise data with colleagues and professional contacts, but not vice versa. For example, a user may wish to share pictures from a cookout to one social media site where the user often communicates with friends, then share a press release from the user's company to a news outlet or professional networking site. Conventional approaches allow the sharing of data indiscriminately, but this often permits embarrassing revelations to colleagues about personal activities. Conversely, conventional solutions do not provide adequate protection for confidential or proprietary enterprise data from being shared with inappropriate personal contacts or on publicly available social media sites.

SUMMARY

This Summary is provided to introduce a selection of concepts in a simplified form that are further described below in the Detailed Description. This Summary is not intended to identify key features or essential features of the claimed subject matter. Neither is this Summary intended to be used to limit the claimed subject matter's scope.

Social media and data sharing controls may be provided. Upon receiving a request to transmit an element of data to a recipient, a determination may be made as to whether the recipient is appropriate to receive the element of data. In response to determining that the recipient is appropriate to receive the element of data, the element of data may be transmitted. In response to determining that the recipient is not appropriate to receive the element of data, at least one remedial action may be performed.

It is to be understood that both the foregoing general description and the following detailed description are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the detailed description.

BRIEF DESCRIPTION OF THE DRAWINGS

Many aspects of the present disclosure can be better understood with reference to the following diagrams. The drawings are not necessarily to scale. Instead, emphasis is placed upon clearly illustrating certain features of the disclosure. Moreover, in the drawings, like reference numerals designate corresponding parts throughout the several views. In the drawings.

DETAILED DESCRIPTION

Figure 1:
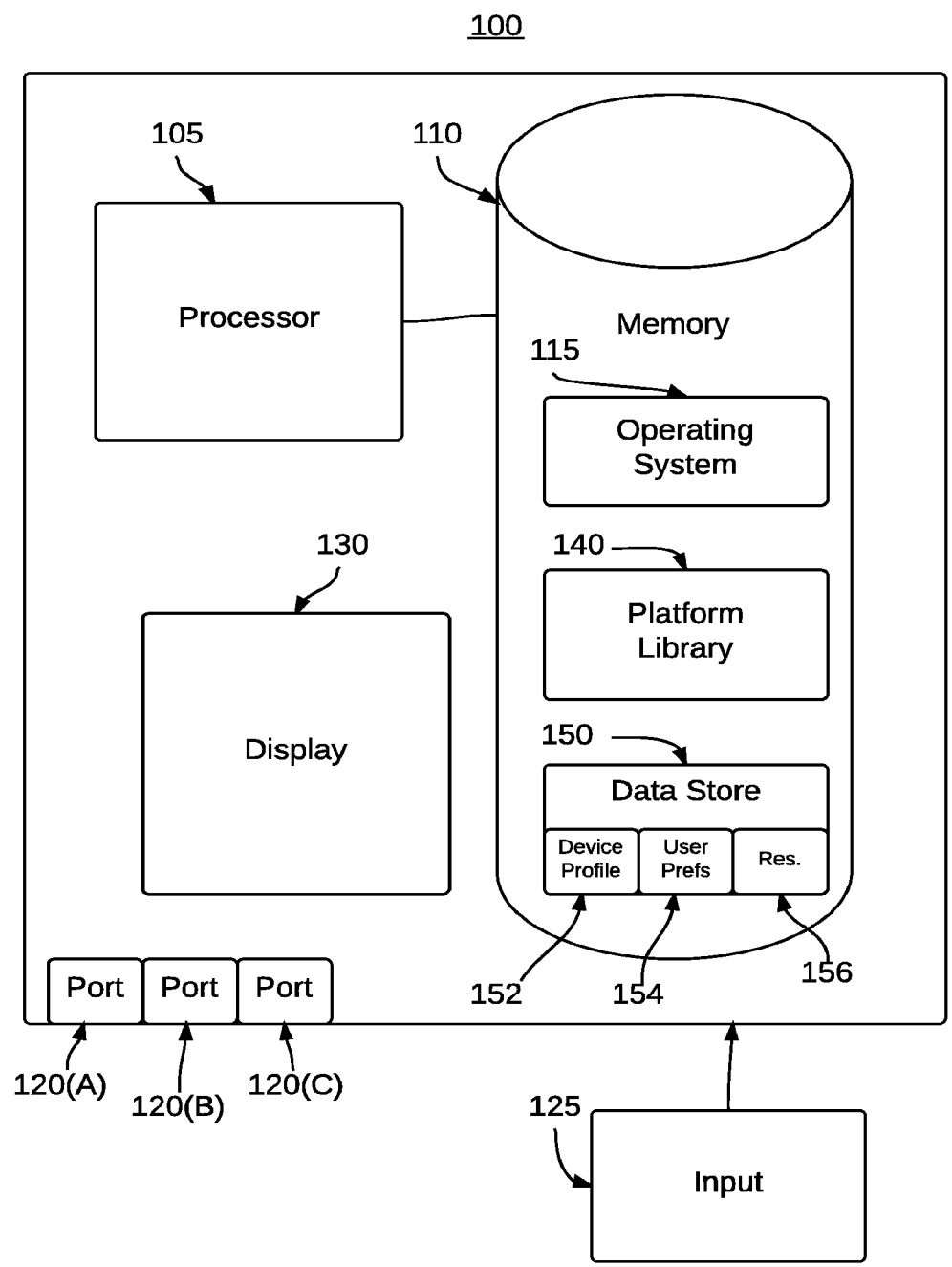
FIG. 1 is a block diagram of a user device.

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Social media controls may be provided. Users often use personal and enterprise devices interchangeably in their daily lives. For example, a user may check Facebook® from their company-issued cellphone, or work on corporate marketing materials from their personally owned home computer. Similarly, users of instant messaging accounts may easily carry on conversations with a colleague or friend from multiple devices, whether the devices be personal or enterprise-owned. Whoever owns a device, however, a management scheme may allow for the segregation of personal and enterprise content to prevent inadvertent sharing of data and potential breaches of privacy.

As an example, a user may bring their own smartphone to work and enroll it in the enterprise's device management scheme. Such a scheme may impose various control over access to resources, such as requiring a device password to retrieve enterprise email. The scheme may also identify contacts and/or applications on the device as being associated with the user's personal/home persona, their enterprise/work persona, and/or both. Further categorizations are also envisioned, such as identifying contacts as being associated with different roles for the user within each persona. For example, a user's home persona may be associated with relatives in a family role and with teachers at a child's school in a parent role. For another example, the user's work persona may be associated with other enterprise employees in an internal role and with particular web sites (e.g., LinkedIn®) and/or contacts at other enterprises (e.g., account managers, sales prospects, etc.) in an external role.

In some embodiments, the user's attempts to share or transmit data may be analyzed to determine if the sharing is appropriate. For example, an email to a contact categorized as 'personal' may be analyzed to determine if it is being sent from a work address and/or contains data marked or identified as confidential. If so, the sharing of the data may be deemed inappropriate and a remedial action may be taken. For example, the user may be asked to confirm sending the data, the email may be prevented from being sent, and/or an author, department head, and/or an administrator associated with the device management scheme may be notified.

In some embodiments, the device management scheme may prohibit some websites and/or applications, such as social media, from being accessed for some users but allow them for other users. For example, a user in an accounting group may have greater restrictions on data sharing to external contacts and applications than a user in a marketing group whose job responsibilities include the monitoring of a competitor's social media activities and/or the sharing of press releases.

Some data may be whitelisted by authorized users for sharing by users in various device management groups. For example, a favorable analyst report may be emailed to users throughout the enterprise with encouragement to share freely. Such a document may be watermarked and/or included on a list of sharing-approved documents in order to allow sharing by users who may ordinarily be prevented from sharing enterprise-related data to social media sites and/or outside contacts.

The technical effects of some embodiments of this disclosure may include establishing control of access to networks and resources when access lists may not be predefined, and reducing and/or eliminating the burden of predefining access lists to control access to networks and resources. Moreover, the technical effects of some embodiments may include enhancing network access control by assigning specific access rights based on access lists to client devices authorized to access associated network beacons and resources.

Other technical effects of some embodiments of this disclosure may offer group management solutions to managing content access and distribution. For example, users of a sales group may have read access to marketing documents and presentations, while users in a marketing group may be able to edit and/or annotate the market documents. Similarly, users in an accounting or business services group may be the only ones with access to enterprise financial documents. These access controls may be provided by distributing authorization credentials to devices associated with users of the respective group. Each user may then authenticate to their device, such as by inputting a username, password, authentication key, and/or biometric data, before the device may access and/or retrieve the content authorized for distribution to that device. These authentication types are provided as examples only and are not intended to be limiting as many other types of user authentication are in use and/or may be contemplated in the future.

Content access may be further limited by policies that enforce other compliance restrictions based on properties of the device such as time, location, device security and/or integrity, presence of another device, software versions, required software, etc. For example, educational settings may designate student and instructor groups. These groups may be further assigned to specific classes such that only student group members associated with a given class may access content associated with that class. Further, edit access to the content for the class may be restricted to the user(s) in the instructor group and/or student group members may be permitted to add content that only the instructor may view (e.g., homework assignments.) In some embodiments, the instructor group user(s) may be able to push content to student group user(s) and/or activate temporary control of the students' devices to prevent the devices from accessing non-class related content during class time.

To reduce the cost of ownership of user devices and cellular and/or data service charges associated with use of such user devices, an enterprise such as an educational institution and/or a business may implement a "bring your own device" (BYOD) policy to allow an employee to use his/her personal device to access enterprise resources rather than provide the user with an enterprise owned user device for such purpose. To support such a BYOD policy, a user device administrator (i.e. IT administrator) may manage a group of personally owned user devices, via a management application executed by a management server in communication with the user devices over a network, to provide the user devices with secure access to enterprise resources.

The user device administrator may enroll user devices into the management system to monitor the user devices for security vulnerabilities and to configure the user devices for secure access to enterprise resources. The user device administrator may create and/or configure at least one configuration profile via a user interface provided by the management system. A configuration profile may comprise a set of instructions and/or settings that configure the operations and/or functions of a user device, which may ensure the security of the accessed resources. The user device administrator may, for instance, configure an enterprise email configuration profile by specifying the network address and access credentials of an enterprise email account that the users of the user devices are authorized to access. Other configuration policies may include, but are not limited to, hardware, software, application, function, cellular, text message, and data use restrictions, which may be based at least in part on the current time and/or location of the restricted user device. The user device administrator may thereafter deploy the configuration profiles to specific user devices, such as to groups of user devices of users with similar roles, privileges and/or titles.

The user devices may also have access to personal configuration profiles that may be created by the users of the user devices. The user devices may, for instance, have access to a personal email configuration profile that was created by a user of the user device to provide access to her personal email account. Thus, a user device enrolled in a BYOD management system may have more than one configuration profile for a given use of the user device, such as a personal email configuration profile and an enterprise email configuration profile that are both used for accessing email accounts on the user device.

The user devices may be instructed to enable and/or disable certain configuration profiles according to authorization rights specified by the user device administrator, such as location and/or time-based authorization rights. For example, a BYOD policy may specify that user devices enrolled in the BYOD management system are authorized for personal use outside of the workday and are authorized for business use during the workday. Similarly, a BYOD device may be restricted to enterprise uses while in work locations and/or prohibited from accessing enterprise resources while outside of secure work locations. To implement such a policy, a user device administrator may instruct the user devices to toggle between personal configuration policies and enterprise configuration policies based on factors such as the current time and/or location associated with the user device.

The current time may be based on the current time at the current location of the user device, which may be determined by GPS, Wi-Fi, Cellular Triangulation, etc., or may be based on the current time at a configured primary location associated with the user device, which may be the primary office location of an employee user of the user device. As an example, time-based configuration profile toggling may be provided by instructing a user device to enable business configuration profiles and disable personal configuration profiles while the current time is between 9 AM and 5 PM at the current location of the user device, and to disable business configuration profiles and enable personal configuration profiles while the current time is between 5 PM and 9 AM at the current location of the user device.

FIG. 1 is a block diagram of a user device 100 comprising a processor 105 and a memory 110. Depending on the configuration and type of device, memory 110 may comprise, but is not limited to, volatile (e.g. random access memory (RAM)), non-volatile (e.g. read-only memory (ROM)), flash memory, or any combination. Memory 110 may store executable programs and related data components of various applications and modules for execution by user device 100. Memory 110 may be coupled to processor 105 for storing configuration data and operational parameters, such as commands that are recognized by processor 105.

Basic functionality of user device 100 may be provided by an operating system 115 contained in memory 100. One or more programmed software applications may be executed by utilizing the computing resources in user device 100. Applications stored in memory 110 may be executed by processor 105 (e.g., a central processing unit or digital signal processor) under the auspices of operating system 115. For example, processor 105 may be configured to execute applications such as web browsing applications, email applications, instant messaging applications, and/or other applications capable of receiving and/or providing data.

Data provided as input to and generated as output from the application(s) may be stored in memory 110 and read by processor 105 from memory 110 as needed during the course of application program execution. Input data may be data stored in memory 110 by a secondary application or other source, either internal or external to user device 100, or possibly anticipated by the application and thus created with the application program at the time it was generated as a software application program. Data may be received via any of a plurality of communication ports 120(A)-(C) of user device 100. Communication ports 120(A)-(C) may allow user device 100 to communicate with other devices, and may comprise components such as an Ethernet network adapter, a modem, and/or a wireless network connectivity interface. For example, the wireless network connectivity interface may comprise one and/or more of a PCI (Peripheral Component Interconnect) card, USB (Universal Serial Bus) interface, PCMCIA (Personal Computer Memory Card International Association) card, SDIO (Secure Digital Input-Output) card, NewCard, Cardbus, a modem, a wireless radio transceiver, and/or the like.

User device 100 may also receive data as user input via an input component 125, such as a keyboard, a mouse, a pen, a stylus, a sound input device, a touch input device, a capture device, etc. A capture device may be operative to record user(s) and capture spoken words, motions and/or gestures, such as with a camera and/or microphone. The capture device may comprise any speech and/or motion detection device capable of detecting the speech and/or actions of the user(s).

Data generated by applications may be stored in memory 110 by the processor 105 during the course of application program execution. Data may be provided to the user during application program execution by means of a display 130. Consistent with embodiments of this disclosure, display 130 may comprise an integrated display screen and/or an output port coupled to an external display screen.

Memory 110 may also comprise a platform library 140. Platform library 140 may comprise a collection of functionality useful to multiple applications, such as may be provided by an application programming interface (API) to a software development kit (SDK). These utilities may be accessed by applications as necessary so that each application does not have to contain these utilities thus allowing for memory consumption savings and a consistent user interface.

Furthermore, embodiments of this disclosure may be practiced in conjunction with a graphics library, other operating systems, or any other application program and is not limited to any particular application or system. The devices described with respect to the Figures may have additional features or functionality. For example, user device 100 may also include additional data storage devices (removable and/or non-removable) such as, for example, magnetic disks, optical disks, or tape (not shown).

User device 100 may comprise a desktop computer, a laptop computer, a personal digital assistant, a cellular telephone, a set-top box, a music player, a web pad, a tablet computer system, a game console, and/or any other device with like capability.

User device 100 may store in a data store 150 a device profile 152 and a plurality of user preferences 154. Device profile 152 may comprise an indication of the current position of user device 100 and/or indications of the hardware, software, and security attributes which describe user device 100. For instance, device profile 152 may represent hardware specifications of user device 100, version and configuration information of various software program and hardware components installed on user device 100, data transmission protocols enabled on user device 100, version and usage information of various resources stored on user device 100, and/or any other attributes associated with the state of user device 100. The device profile 152 may further comprise data indicating a date of last virus scan of user device 100, a date of last access by an IT representative, a date of last service by the IT representative, and/or any other data indicating maintenance and usage of user device 100. Furthermore, the device profile 152 may comprise indications of the past behavior of associated users, such as resources accessed, charges for resource accesses, and the inventory accessed from such resources. User preferences 154 may comprise a listing of factors that may affect the experience of the user. In particular, user preferences 154 may include indications of the user's age, gender, bodily traits, preferred resource types, preferred venue resources, and combinations thereof.

User device 100 may also store at least one resource 156 in the data store 150. Resources 156, for instance, may include any electronic data, such as databases, applications, text files, word processor files, spreadsheet files, presentation files, graphic files, audio files, photographic files, video files, applications and application files, and/or the like. More specifically, resources 156 may include at least one of the following file types: data files, audio files, video files, three-dimensional image files, raster image files, vector image files, page layout files, spreadsheet files, database files, executable files, CAD files, web files, plug-in files, font files, system files, settings files, encoded files, compressed files, disk image files, developer files, backup files, and/or any other files.

Figure 2:
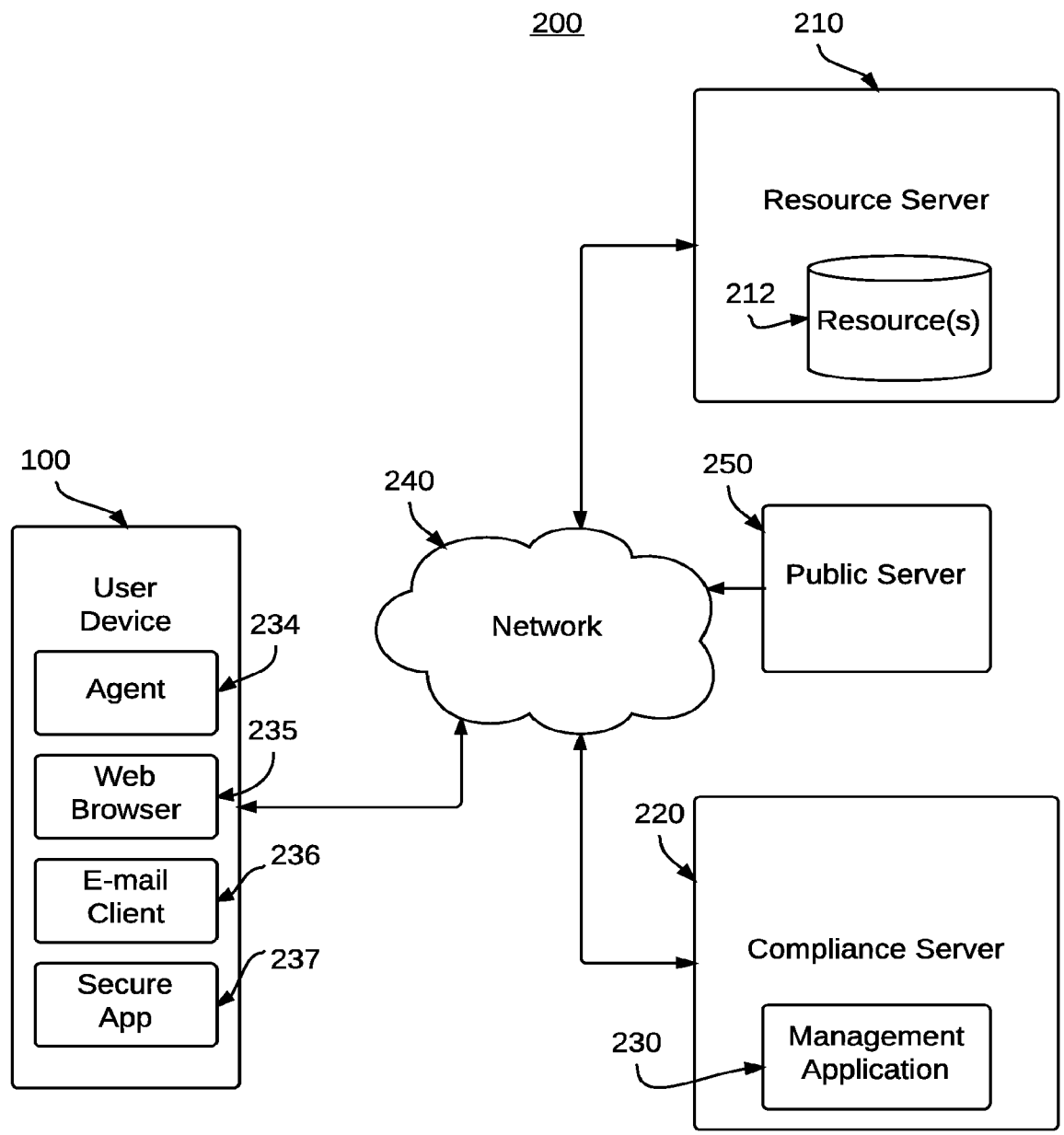
FIG. 2 is a block diagram of an operating environment for providing device management.

FIG. 2 is a block diagram view of an operating environment 200 comprising user device 100 in communication with a resource server 210, which may provide one or more resource(s) 215, and a compliance server 220, which may provide a management application 230, via a network 240. User device 100, resource server 210, and/or compliance server 220 may be operative to communicate with a public server 250 via network 240. In some embodiments, management application 230 may be operative to execute on user device 100 and/or resource server 210.

The compliance server 220 may comprise, for example, cloud-based solutions, server computers and/or any other system providing device management capability. For purposes of convenience, the compliance server 220 is referred to herein in the singular, although it is understood that a plurality of servers may be employed in the arrangements as descried herein. Furthermore, in some embodiments, multiple compliance servers 220 may operate on the same server computer. The components executed on the compliance server 220, for example, may comprise various applications, services, processes, systems, engines, or functionality not disclosed in detail herein.

The compliance server 220 may comprise management application 230 comprising a plurality of compliance rules and/or policies that may be applicable to user device 100. While the management application 230 is shown as within the compliance server 220, the management application 230 may alternately be within the user device 100 and/or remotely located on the resource server 210 and may be remotely updated periodically by compliance server 220 according to common over-the-air (OTA) updating methods. Attempts by user device 100 to perform certain functionality on user device 100 may require user device 100 to be in compliance with one and/or more of the compliance policies/rules. Depending on the sensitivity of a given functionality, different compliance rules may be necessary to ensure that the functionality is adequately restricted. Some functionality may only require ensuring that the proper user is requesting the functionality. Other resources may require compliance with more stringent authorization rules, such as determining whether the functionality is restricted during certain time windows. Accordingly, user device 100 and/or compliance server 220 may be operative to determine whether the user of user device 100 is authorized to perform requested functionality at the time the user requests to perform such functionality.

Compliance server 220 may use the compliance rules to impose hardware restrictions regarding the use of specific wireless devices and specific wireless device features, such as, for instance, cameras, Bluetooth, IRDA, tethering, external storage, a mobile access point, and/or other hardware restrictions. The compliance rules may also impose software restrictions such as the use of specific wireless device operating systems or applications, internet browser restrictions, screen capture functionality, and/or other software restrictions. Mobile device management restrictions included in the compliance rules may comprise encryption requirements, firmware versions, remote lock and wipe functionalities, logging and reporting features, GPS tracking, and/or other mobile device management features.

The compliance server 220 may determine whether the device characteristics of a requesting device (e.g. user device 100) satisfy one or more of the restrictions enumerated in the compliance rules. For example, the compliance server 220 may determine that a requesting device that has a camera, Bluetooth capability, and is executing a specified version of an operating system is compliant with the compliance rules. As another example, the compliance server 220 may determine that a requesting device that is associated with an external storage unit and has screen capture functionality enabled is not compliant with the compliance rules.

In some embodiments, an agent application 234 executed on user device 100 may make the compliance determination based on the device profile, credentials, and/or user preferences. For instance, the agent application 234 may monitor calls by applications, such as a client application 235, and/or a secure application 236, on user device 100 to the operating system 115 of user device 100 to determine whether user device 100 seeks to perform functionality associated with one and/or more of the compliance rules described above. Additionally, the agent application 234 on user device 100 may approve and/or deny the associated functionality requests. For instance, the agent application 234 may instruct operating system 115 on user device 100 to disable the camera of user device 100 in response to a determination that a compliance rule specifies that the camera cannot be used at the time of the request by the user device 100 to operate the camera.

In some embodiments, the agent application 234 executed on user device 100 may rely on compliance server 220 to determine whether a given functionality request on user device 100 is permitted according to the compliance rules. For instance, the agent application may transmit a functionality request, a device profile, credentials, and/or user preferences to compliance server 220 so that compliance server 220 may determine whether user device 100 seeks to perform functionality that may violate a given compliance rule. Additionally, compliance server 220 may approve and/or deny the associated functionality requests. For instance, compliance server 220 may instruct the agent application 234 on user device 100 to instruct operating system 115 to activate a VPN security profile prior to opening a document and/or link.

In some embodiments, the compliance rules may comprise device settings and/or executable instructions that define which functionality the operating system 115 of user device 100 is authorized to perform. Furthermore, the compliance rules may comprise a list of functions, such as those provided by APIs associated with operating system 115 and/or platform library 140, that may be treated as protected functions. Calls to these functions, such as calls to retrieve login credentials, may result in checks by user device 100 and/or compliance server 220 for compliance with the compliance rules.

In some embodiments, the agent 234 may perform a set of ordered operations to accomplish a requested function. These operation sets may be defined by the user device 100 and/or compliance server 220 and may comprise one and/or more operations to determine whether the user device 100 is in compliance with policies from policy store 230. The agent 234 may control at least one respective computing resource of the user device 100. The operations may include configuring at least one respective computing resource of the user device 100 such as restricting access to at least one resource managed by the agent 234.

The Network 240 may comprise, for example, any type of wired and/or wireless network such as a wireless local area network (WLAN), a wireless wide area network (WWAN), Ethernet, fiber-optic network, and/or any other type of wired and/or wireless network now known or later developed. Additionally, the Network 240 may be or include the Internet, intranets, extranets, microwave networks, satellite communications, cellular systems, PCS, infrared communications, global area networks, or other suitable networks, etc., or any combination of such networks.

The public server 250 may comprise a content and/or message distribution server such as a social media website, a forum, an instant messaging server, and/or an email distribution server. In some embodiments, public server 250 may be accessible to anyone who connects to public server 250 over network 240, may require user registration and/or may require use of an authorized user device 100.

Figure 3:
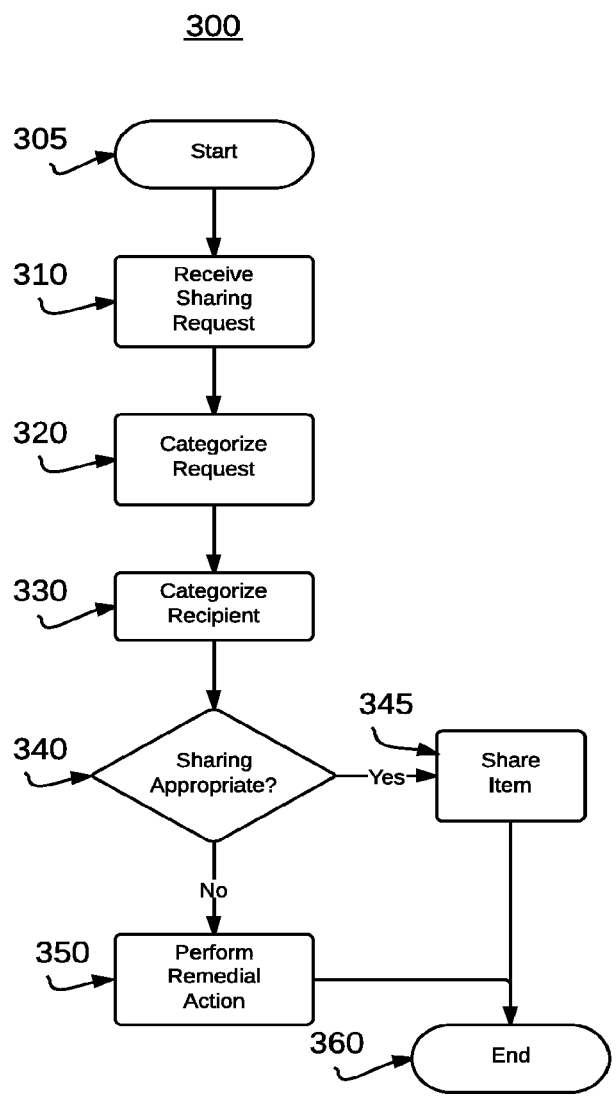
FIG. 3 is a flow chart illustrating a method for providing social media controls.

FIG. 3 is a flow chart setting forth the general stages involved in a method 300 consistent with embodiments of this disclosure for providing social media and data access controls. For convenience, method 300 is described below as being performed by an instance of user device 100. This is intended as a non-limiting example, as any and/or all stages of method 300 may be performed by any of the components of operating environment 200. Ways to implement the stages of method 300 will be described in greater detail below. Method 300 may begin at starting block 305 and proceed to stage 310 where user device 100 may receive a request to share an element of data. For example, a user may attempt to send an email with a document attachment and/or may attempt to post an activity update to a social media site.

From stage 310, method 300 may advance to stage 320 where user device 100 may categorize the request to share the data. For example, agent application 234 may intercept the request and categorize the type of sharing and/or the element of data. For example, requests to share with some sites, such as a professional networking site (e.g., LinkedIn®) may be categorized as professional and/or work-related requests while requests to share with other sites (e.g., Facebook®) may be categorized as personal requests. Similarly, the data to be shared may be categorized as work or personal related, categorized by type (e.g., e-mail, document, activity update), and/or categorized as approved or not. For example, request to share what song is being listened to on user device 100 with public server 250 as an instant messaging service status may be categorized as a request to share a personal activity update.

In some embodiments, the data itself may be analyzed to identify the appropriate category. For example, a document may be scanned for keywords such as "Confidential" or "Privileged," and/or for enterprise-related keyword such as competitor names, project names, versions, and/or codenames. Similarly, the contents of the data may be compared to a white list of data allowed to be shared and categorized as permitted or not. Such white lists may be data, user and/or group specific, such as where a marketing group member is allowed to share videos comprising product data on YouTube while development group members are not.

From stage 320, method 300 may advance to stage 330 where user device 100 may categorize a recipient of the data according to the request. For example, user device 100 may analyze a contact record associated with the recipient to determine whether the recipient comprises a work or personal contact. Such analysis may comprise, for example, determining whether the contact record is associated with an enterprise address book and/or whether a phone number or email address associated with the recipient comprises a corporate contact method (e.g., the recipient's email address may comprise the same domain as the requesting user's email address and/or the same telephone exchange. In some embodiments, the identify of public server 250 may be used to categorize the recipient, such as where some social media sites are categorized as professional and/or work related while others may be categorized as personal. In some embodiments, work-categorized recipients may be specifically identified on a white list, while any other site may be categorized as non-work by default. Similarly, specific recipients may be categorized as personal while other recipients are categorized as non-personal by default.

From stage 330, method 300 may advance to stage 340 where user device 100 may determine whether sharing is appropriate. For example, agent application 234 may determine whether the category of the data to be shared is compatible and/or the same as the category of the recipient, such as where personal category data is to be shared with a personal category web site. In some embodiments, management application 230 may provide one and/or more rules governing what categories of data may be shared with what categories of recipients. For example, a rule may be configured such that personal web browsing history may not be appropriate to be shared with work-related recipients. Such a rule may be further configured to allow an exception for sharing with a work-related recipient if, for example, that work-related recipient is monitoring the device for improper usage during business hours.

If the sharing is determined to be appropriate at stage 340, method 300 may advance to stage 345 where user device 100 may cause the data to be shared. For example, user device 100 may transmit the shared data to public server 250 and or send a message, document, and/or other element of data to another instance of user device 100.

If the sharing is determined not to be appropriate at stage 340, method 300 may advance to stage 350 where user device 100 may perform a remedial action. For example, user device 100 may notify a user that the sharing is not appropriate, request confirmation of the sharing of the data, prevent the sharing of the data, create a log event of the request to share the data, and/or notify an administrator of the request to share the data. Method 300 may then end at stage 360.

An embodiment consistent with the disclosure may comprise a system for providing social media and data sharing controls. The system may comprise a memory storage and a processing unit coupled to the memory storage. The processing unit may be operative to receive a request to transmit an element of data to a recipient, determine whether the recipient is appropriate to receive the element of data, in response to determining that the recipient is appropriate to receive the element of data, cause the element of data to be transmitted, and in response to determining that the recipient is not appropriate to receive the element of data, causing at least one remedial action to be performed.

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of this disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. The Figures above and their associated descriptions provide a discussion of a variety of operating environments in which embodiments of this disclosure may be practiced. However, the devices and systems illustrated and discussed with respect to the Figures are for purposes of example and illustration and are not limiting of a vast number of computing device configurations that may be utilized for practicing embodiments of this disclosure as described herein.

The term computer readable media as used herein may include computer storage media. Computer storage media may include volatile and nonvolatile, removable and non-removable media implemented in any method or technology for storage of information, such as computer readable instructions, data structures, program modules, or other data. System memory, removable storage, and non-removable storage are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store.

The term computer readable media as used herein may also include communication media. Communication media may be embodied by computer readable instructions, data structures, program modules, non-transitory media, and/or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

A number of applications and data files may be used to perform processes and/or methods as described above. The aforementioned processes are examples, and a processing unit may perform other processes. Other programming modules that may be used in accordance with embodiments of this disclosure may include electronic mail, calendar, and contacts applications, data processing applications, word processing applications, spreadsheet applications, database applications, slide presentation applications, drawing or computer-aided application programs, etc.

Generally, consistent with embodiments of this disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of this disclosure may also be practiced in distributed computing environments where tasks are performed by remote processing devices that are linked through a communications network. In a distributed computing environment, program modules may be located in both local and remote memory storage devices.

Furthermore, embodiments of this disclosure may be practiced in an electrical circuit comprising discrete electronic elements, packaged or integrated electronic chips containing logic gates, a circuit utilizing a microprocessor, or on a single chip containing electronic elements or microprocessors. Embodiments of this disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of this disclosure may, for example, be implemented as a computer process and/or method, a computing system, an apparatus, device, or appliance, and/or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of this disclosure may be practiced via a system-on-a-chip (SOC) where each and/or many of the elements described above may be integrated onto a single integrated circuit. Such an SOC device may include one or more processing units, graphics units, communications units, system virtualization units and various application functionalities, all of which may be integrated (or "burned") onto the chip substrate as a single integrated circuit. When operating via an SOC, the functionality, described herein, with respect to training and/or interacting with any element may operate via application-specific logic integrated with other components of the computing device/system on the single integrated circuit (chip).

Embodiments of this disclosure are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and the property of the Assignee. The Assignee retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
receiving a request to transmit an element of data to a recipient on behalf of a sender, the request identifying a service through which the element of data is requested to be shared from a mobile device associated with the sender;
determining whether the element of data is allowed to be shared through the service based upon determining a first category for a network address of a public server of the service through which the element of data is requested to be shared;
identifying a contact record associated with the recipient;
determining whether the recipient is appropriate to receive the element of data based upon whether the first category corresponds to a second category determined for the contact record associated with the recipient;
in response to determining that the recipient is appropriate to receive the element of data and that the element of data is allowed to be shared, causing the element of data to be transmitted to the public server associated with the service; and
in response to determining that the recipient is not appropriate to receive the element of data, performing at least one remedial action.

2. The method of claim 1, wherein determining whether the element of data is allowed to be shared through the service further comprises determining whether the content of the element of data contains a keyword associated with a professional context of the sender.

3. The method of claim 2, wherein determining whether the content of the element of data contains the keyword associated with the professional context of the sender further comprises determining whether the content includes a predetermined term specified in a compliance rule.

4. The method of claim 1, wherein determining whether the recipient is appropriate to receive the element of data is based upon whether the contact record associated with the recipient corresponds to a professional service or a personal service.

5. The method of claim 1, wherein performing the at least one remedial action further comprises at least one of: requesting user confirmation of the request to transmit the element of data to the recipient or logging the request to transmit the element of data.

6. A system comprising:
a user device; and
an agent executed by the user device, the agent, when executed, being configured to cause the user device to at least:
receive a request to transmit an element of data to a recipient on behalf of a sender, the request identifying a service through which the element of data is requested to be shared from the user device associated;
determine whether the element of data is allowed to be shared through the service based upon determining a first category for a network address of a public server of the service through which the element of data is requested to be shared;
identify a contact record associated with the recipient;
determine whether the recipient is appropriate to receive the element of data based upon whether the first category corresponds to a second category determined for the contact record associated with the recipient;
in response to determining that the recipient is appropriate to receive the element of data and that the element of data is allowed to be shared, cause the element of data to be transmitted to the public server associated with the service; and
in response to determining that the recipient is not appropriate to receive the element of data, perform at least one remedial action.

7. The system of claim 6, wherein the agent determines whether the element of data is allowed to be shared through the service by determining whether the content of the element of data contains a keyword associated with a professional context of the sender.

8. The system of claim 7, wherein the agent determines whether the content of the element of data contains the keyword associated with the professional context of the sender by determining whether the content includes a predetermined term specified in a compliance rule.

9. The system of claim 6, wherein the agent determines whether the recipient is appropriate to receive the element of data based upon whether the contact record associated with the recipient corresponds to a professional service or a personal service.

10. The system of claim 6, wherein the agent performs the at least one remedial action by at least one of: requesting user confirmation of the request to transmit the element of data to the recipient, logging the request to transmit the element of data, or preventing sharing of the element of data.

11. A non-transitory computer-readable medium embodying a program that, when executed, causes at least one computing device to at least:
- receive a request to transmit an element of data to a recipient on behalf of a sender, the request identifying a service through which the element of data is requested to be shared from a mobile device associated with the sender;
- determine whether the element of data is allowed to be shared through the service based upon determining a first category for a network address of a public server of the service through which the element of data is requested to be shared;
- identify a contact record associated with the recipient;
- determine whether the recipient is appropriate to receive the element of data based upon whether the first category corresponds to a second category determined for the contact record associated with the recipient;
- in response to determining that the recipient is appropriate to receive the element of data and that the element of data is allowed to be shared, cause the element of data to be transmitted to the public server associated with the service; and
- in response to determining that the recipient is not appropriate to receive the element of data, perform at least one remedial action.

12. The non-transitory computer-readable medium of claim 11, wherein the program, when executed, determines whether the content of the element of data contains a keyword associated with a professional context of the sender by determining whether the content includes a predetermined term specified in a compliance rule.

13. The non-transitory computer-readable medium of claim 11, wherein the program, when executed, determines whether the recipient is appropriate to receive the element of data based upon whether the contact record associated with the recipient corresponds to a professional service or a personal service.

14. The non-transitory computer-readable medium of claim 11, wherein the program, when executed, determines whether the element of data is allowed to be shared through the service by determining whether the content of the element of data contains a keyword associated with a professional context of the sender.

15. The non-transitory computer-readable medium of claim 11, wherein the program, when executed, performs the at least one remedial action by at least one of: requesting user confirmation of the request to transmit the element of data to the recipient, logging the request to transmit the element of data, or preventing sharing of the element of data.

16. The method of claim 1, further comprising determining to impose a hardware restriction on the mobile device associated with the sender based upon a determination that the mobile device has a capture device that is restricted according to a compliance rule, the capture device being able to record audio or capture an image.

17. The method of claim 16, wherein the hardware restriction is imposed based upon a determination of a location of the mobile device and a period of time, the determination of the location being based upon a wireless device associated with the mobile device.

18. The system of claim 6, wherein the agent determines to impose a hardware restriction on the user device associated with the sender based upon a determination that the user device has at least one device characteristic that is restricted according to a compliance rule.

19. The system of claim 6, wherein the agent determines to impose a software restriction on the user device based upon a determination that the user device has at least one software feature enabled and an external storage device.

20. The method of claim 1, wherein the first category is determined based upon the network address of the public server by determining whether the network address is on a whitelist of professional sites.

* * * * *